US012618663B2

(12) United States Patent
Fang et al.

(10) Patent No.: US 12,618,663 B2
(45) Date of Patent: May 5, 2026

(54) TORSION COMPENSATION SYSTEM AND COMPENSATION METHOD FOR FIBER BRAGG GRATING CURVATURE SENSOR

(71) Applicant: China University of Mining and Technology, Xuzhou (CN)

(72) Inventors: Xinqiu Fang, Xuzhou (CN); Yang Song, Xuzhou (CN); Ningning Chen, Xuzhou (CN); Haotian Feng, Xuzhou (CN); Dexing He, Xuzhou (CN); Minfu Liang, Xuzhou (CN); Gang Wu, Xuzhou (CN); Yang Wu, Xuzhou (CN)

(73) Assignee: China University of Mining and Technology, Xuzhou (CN)

( * ) Notice: Subject to any disclaimer, the term of this patent is extended or adjusted under 35 U.S.C. 154(b) by 140 days.

(21) Appl. No.: 18/890,810

(22) Filed: Sep. 20, 2024

(65) Prior Publication Data

US 2026/0085927 A1     Mar. 26, 2026

(51) Int. Cl.
      *G01B 11/24*            (2006.01)
(52) U.S. Cl.
      CPC .................................... *G01B 11/24* (2013.01)
(58) Field of Classification Search
      None
      See application file for complete search history.

(56) References Cited

U.S. PATENT DOCUMENTS

| | | | |
|---|---|---|---|
| 7,324,714 B1 * | 1/2008 | Cranch | G01B 11/18 |
| | | | 250/227.16 |
| 10,612,911 B1 * | 4/2020 | Pena, III | G01B 11/161 |

| | | | |
|---|---|---|---|
| 2010/0215311 A1 * | 8/2010 | Moore | G01B 11/18 |
| | | | 356/73.1 |
| 2011/0109898 A1 * | 5/2011 | Froggatt | G01L 1/242 |
| | | | 356/73.1 |
| 2013/0308138 A1 * | 11/2013 | 'T Hooft | G01B 11/24 |
| | | | 356/601 |

(Continued)

FOREIGN PATENT DOCUMENTS

| | | | | |
|---|---|---|---|---|
| CN | 111397542 A | * | 7/2020 | G01B 11/272 |
| CN | 111811434 A | * | 10/2020 | G01B 11/27 |

(Continued)

*Primary Examiner* — Michelle M Iacoletti
*Assistant Examiner* — Maher Yazback
(74) *Attorney, Agent, or Firm* — Bayramoglu Law Offices LLC

(57)          ABSTRACT

The provided is a torsion compensation system and a compensation method for a FBG curvature sensor. The compensation system includes a FBG curvature sensor, installed on a scraper conveyor; angle sensors, including two and installed on both sides of the FBG curvature sensor, are configured to obtain the torsion angle of the FBG curvature sensor by monitoring the difference between the two ends of the FBG curvature sensor; a FBG string, arranged on the FBG curvature sensor to form a plurality of grating measuring points, is configured to perceive the center wavelength of the FBG curvature sensor; a FBG demodulator, coupled with the FBG string, is configured to convert the optical signal of the center wavelength perceived by the FBG string into an electrical signal; a computer, respectively coupled with the angle sensors and the FBG demodulator, is configured to eliminate the FBG wavelength variation caused by torsion.

20 Claims, 5 Drawing Sheets

(56) References Cited

U.S. PATENT DOCUMENTS

2014/0053654 A1\*  2/2014  Rogge ..................... G01L 1/246
                                           73/800
2019/0170930 A1\*  6/2019  Schade ................. G02B 6/021

FOREIGN PATENT DOCUMENTS

CN        115853594 A  \*  3/2023
WO    WO-2018133562 A1 \*  7/2018  ............ E21F 13/066

\* cited by examiner

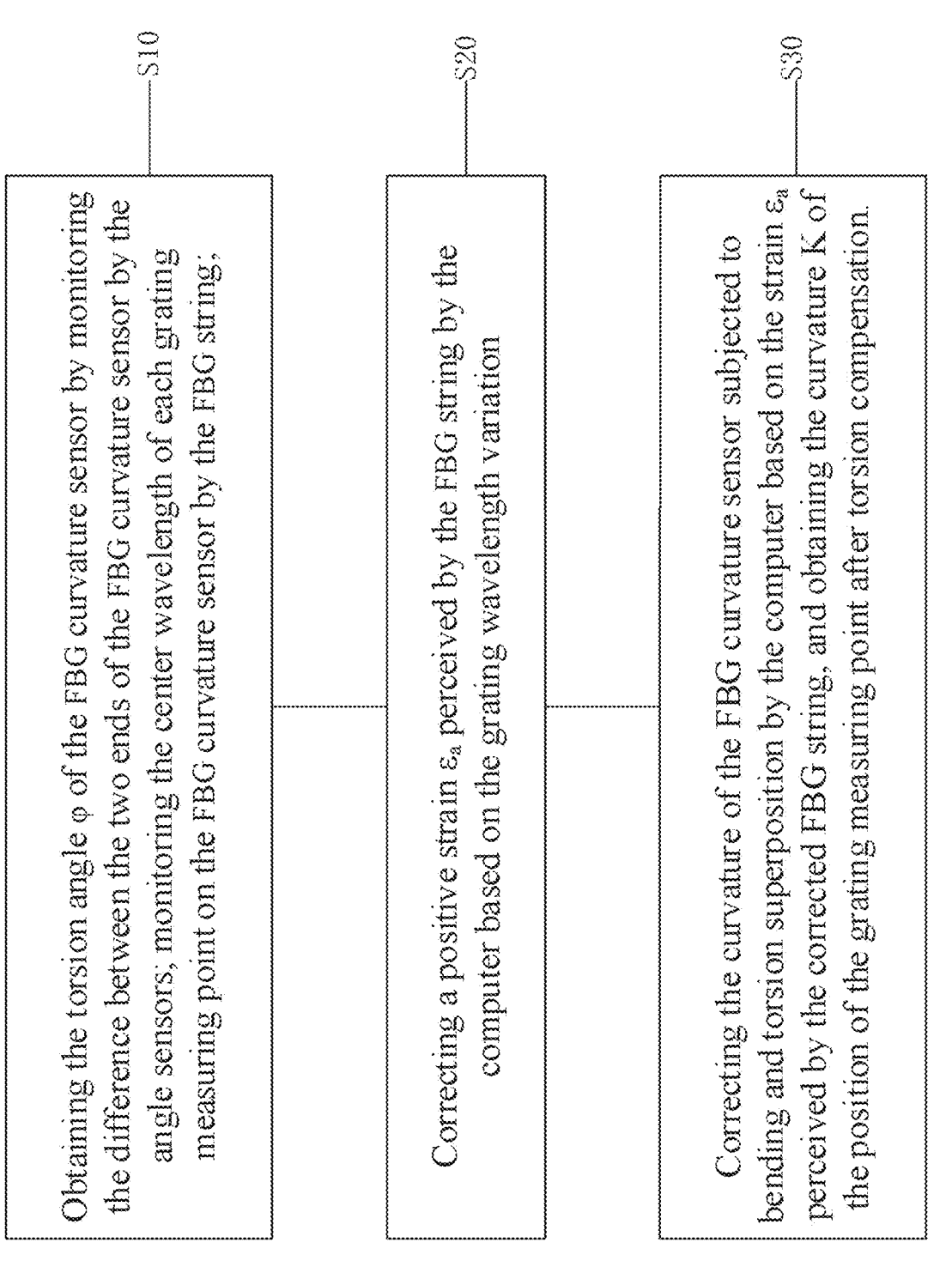

Obtaining the torsion angle φ of the FBG curvature sensor by monitoring the difference between the two ends of the FBG curvature sensor by the angle sensors; monitoring the center wavelength of each grating measuring point on the FBG curvature sensor by the FBG string; —S10

Correcting a positive strain $\varepsilon_a$ perceived by the FBG string by the computer based on the grating wavelength variation —S20

Correcting the curvature of the FBG curvature sensor subjected to bending and torsion superposition by the computer based on the strain $\varepsilon_a$ perceived by the corrected FBG string, and obtaining the curvature K of the position of the grating measuring point after torsion compensation. —S30

FIG. 5

TORSION COMPENSATION SYSTEM AND COMPENSATION METHOD FOR FIBER BRAGG GRATING CURVATURE SENSOR

CROSS-REFERENCE TO THE RELATED APPLICATIONS

This application is based upon and claims priority to Chinese Patent Application No. 202310801288.1, filed on Jul. 1, 2023, the entire contents of which are incorporated herein by reference.

TECHNICAL FIELD

The invention relates to the field of mine fiber sensing, in particular to a torsion compensation system and a compensation method for a fiber Bragg grating (FBG) curvature sensor.

BACKGROUND

The accurate perception of the straightness of the scraper conveyor is of great significance for the construction of an intelligent working face, through the accurate perception of the straightness of the scraper conveyor, can provide data support for the realization of three straight and two flat technology in intelligent working face and the construction of unmanned working face. At present, the mainstream technology is to install inertial navigation in the shearer fuselage and invert the straightness of the scraper conveyor through the running track of the shearer, however, this technology has the disadvantages of cumulative error, indirect error, perceived lag, and high cost, which is difficult to effectively guide the long-term non-stop operation of the unmanned working face.

Compared with the traditional electromagnetic sensor, the FBG curvature sensor has the advantages of easy bending, passivity, and anti-electromagnetic interference, in recent years, the FBG curvature sensor has been used to sense the straightness of the scraper conveyor in the coal mine, but the ultra-long distance arrangement of the FBG curvature sensor along the scraper conveyor makes this kind of sensor easy to produce torsion, which leads to the superposition of the FBG wavelength drift from the bending and torsion of the sensor. As a result, error is generated in the shape monitoring, and it is difficult to meet the requirements of the straightness perception accuracy of the underground scraper conveyor. Therefore, the invention of a torsion compensation system and method for the FBG curvature sensor of scraper conveyor is beneficial to improve the straightness perception accuracy of scraper conveyor based on FBG, and lay a foundation for the popularization and application of FBG curvature sensor in coal mine.

SUMMARY

Aiming at the problems and requirements mentioned above, this scheme proposes a torsion compensation system and a compensation method for a FBG curvature sensor, because the following technical characteristics are adopted, the above technical purposes can be realized, and many other technical effects can be brought.

One purpose of the invention is to propose a torsion compensation system of a FBG curvature sensor, comprising:

a FBG curvature sensor, installed on a scraper conveyor;

angle sensors, comprising two and installed on both sides of the FBG curvature sensor, are configured to obtain a torsion angle of the FBG curvature sensor by monitoring a difference between two ends of the FBG curvature sensor;

a FBG string, arranged on the FBG curvature sensor to form a plurality of grating measuring points, is configured to perceive a center wavelength of the FBG curvature sensor;

a FBG demodulator, coupled with the FBG string, is configured to convert an optical signal of the center wavelength perceived by the FBG string into an electrical signal;

a computer, respectively coupled with the angle sensors and the FBG demodulator, is configured to eliminate a FBG wavelength variation caused by torsion based on a received torsion angle and the center wavelength, so as to obtain a curvature of a position where the grating measuring point is located after torsion compensation.

In this technical scheme, the torsion angle $\varphi$ of the FBG curvature sensor is obtained by monitoring the difference between the two ends of the FBG curvature sensor by the angle sensors, and the center wavelength of each grating measuring point on the FBG curvature sensor is monitored by the FBG string, the optical signal of the center wavelength perceived by the FBG string is converted into an electrical signal by the FBG demodulator; after the torsion angle and center wavelength are obtained by the computer, the positive strain $\varepsilon_a$ perceived by the sensor FBG string is corrected by the computer based on the grating wavelength variation; then, the curvature of the FBG curvature sensor subjected to the superposition of bending and torsion is corrected by the computer based on a modified sensor FBG string sensing strain $\varepsilon_a$, and the curvature K of the position of the grating measuring point is obtained. The compensation system separates the wavelength drift of the FBG of the sensitive element into the bending and torsion of the sensor, by eliminating the wavelength drift induced by the torsion of the sensor, the torsion compensation of the FBG curvature sensor of the scraper conveyor is realized, which can solve the curvature characteristics of the sensor more accurately and realize the straightness perception of the scraper conveyor with higher precision.

In addition, according to the torsion compensation system of the FBG curvature sensor of the invention, it can also have the following technical characteristics:

In an example of the invention, the FBG string comprises:

a first FBG string arranged along an extended direction of the FBG curvature sensor;

a second FBG string arranged along the extended direction of the FBG curvature sensor;

where the first FBG string and the second FBG string are separated by 90 degrees in a circumferential direction of the FBG curvature sensor.

In an example of the invention, the computer comprises:

a first correction module, the first correction is configured to correct the positive strain $\varepsilon_a$ perceived by the FBG string based on the grating wavelength variation;

a second correction module, the second correction module is configured to correct the curvature of the FBG curvature sensor under the superposition of bending and torsion based on the positive strain $\varepsilon_a$ perceived by a corrected FBG string, so as to obtain a curvature K of a position of the grating measuring point after torsion compensation.

In an example of the invention, a correction formula for the positive strain of the FBG caused by the bending of the FBG curvature sensor is:

$$\varepsilon_a = \left[\left(1 + \frac{\Delta\lambda}{\lambda_B(1 - p_e)}\right)^2 - \left(\frac{r\varphi}{l}\right)^2\right]^{\frac{1}{2}} - 1$$

where r is a distance between the FBG and a centroid, $\varphi$ is a torsion error angle of the FBG curvature sensor of the scraper conveyor, l is a length of the FBG curvature sensor of the scraper conveyor, $\Delta\lambda$ is a grating wavelength variation, $\lambda_B$ is an initial wavelength of the FBG, and $P_e$ is an effective elastic-optical coefficient of the fiber.

In an example of the invention, a modified expression of the curvature K at the position of the grating measuring point after torsion compensation is:

$$K = \left[\left(\frac{1}{r} + \frac{\Delta\lambda}{M}\right)^2 - \left(\frac{\varphi}{l}\right)^2\right]^{\frac{1}{2}} - \frac{1}{r}$$

where r is the distance between the FBG and the centroid, $\varphi$ is the torsion error angle of the FBG curvature sensor of the scraper conveyor, l is the length of the FBG curvature sensor of the scraper conveyor, $\Delta\lambda$ is the grating wavelength variation, $\lambda_B$ is the initial wavelength of the FBG, and M is a curvature sensitivity coefficient of the FBG.

In an example of the invention, the computer also comprises:

a visualization module, the visualization module is configured to realize a visualization of a two-dimensional curve and a three-dimensional curve of the scraper conveyor through a discrete curvature continuous algorithm based on compensated curvature information.

In an example of the invention, it also comprises: a server, one end of the server is coupled with the angle sensors and the FBG demodulator respectively, and the other end is coupled with the computer, which is configured to receive and store the torsion angle and the center wavelength, so that the torsion angle and the center wavelength stored in the server can be called by the computer.

Another purpose of the invention is to propose a compensation method for the torsion compensation system of the FBG curvature sensor as described above, comprising the following steps:

S10: obtaining the torsion angle $\varphi$ of the FBG curvature sensor by monitoring the difference between the two ends of the FBG curvature sensor by the angle sensors; monitoring the center wavelength of each grating measuring point on the FBG curvature sensor by the FBG string;

S20: correcting a positive strain $\varepsilon_a$ perceived by the FBG string by the computer based on the grating wavelength variation;

S30: correcting the curvature of the FBG curvature sensor subjected to bending and torsion superposition by the computer based on the strain $\varepsilon_a$ perceived by the corrected FBG string, and obtaining the curvature K of the position of the grating measuring point after torsion compensation.

In an example of the invention, after S30, it also comprises:

based on the compensated curvature information, the computer can also realize the visualization of the two-dimensional curve and the three-dimensional curve of the scraper conveyor through the discrete curvature continuous algorithm.

In an example of the invention, in S20, the correction formula for the positive strain of the FBG caused by the bending of the FBG curvature sensor is:

$$\varepsilon_a = \left[\left(1 + \frac{\Delta\lambda}{\lambda_B(1 - p_e)}\right)^2 - \left(\frac{r\varphi}{l}\right)^2\right]^{\frac{1}{2}} - 1$$

where r is the distance between the FBG and the centroid, $\varphi$ is the torsion error angle of the FBG curvature sensor of the scraper conveyor, l is the length of the FBG curvature sensor of the scraper conveyor, $\Delta\lambda$ is the grating wavelength variation, $\lambda_B$ is the initial wavelength of the FBG, and $P_e$ is the effective elastic-optical coefficient of the fiber.

In an example of the invention, in S30, the modified expression of the curvature K at the position of the grating measuring point after torsion compensation is:

$$K = \left[\left(\frac{1}{r} + \frac{\Delta\lambda}{M}\right)^2 - \left(\frac{\varphi}{l}\right)^2\right]^{\frac{1}{2}} - \frac{1}{r}$$

where r is the distance between the FBG and the centroid, $\varphi$ is the torsion error angle of the FBG curvature sensor of the scraper conveyor, l is the length of the FBG curvature sensor of the scraper conveyor, $\Delta\lambda$ is the grating wavelength variation, $\lambda_B$ is the initial wavelength of the FBG, and M is the curvature sensitivity coefficient of the FBG.

In the following, the optimal embodiment of the invention will be described in more detail in combination with the attached figures, so that the characteristics and advantages of the invention can be easily understood.

BRIEF DESCRIPTION OF THE DRAWINGS

In order to clarify the technical scheme of the embodiment of the invention more clearly, the figures of the embodiment of the invention are briefly introduced in the following. Where the figures are used only to show some embodiments of the invention, not to limit all embodiments of the invention to them.

FIG. 5 is a flow chart of the torsion compensation method for the FBG curvature sensor according to the embodiment of the invention.

MARKS IN THE FIGURES

Figure 1:
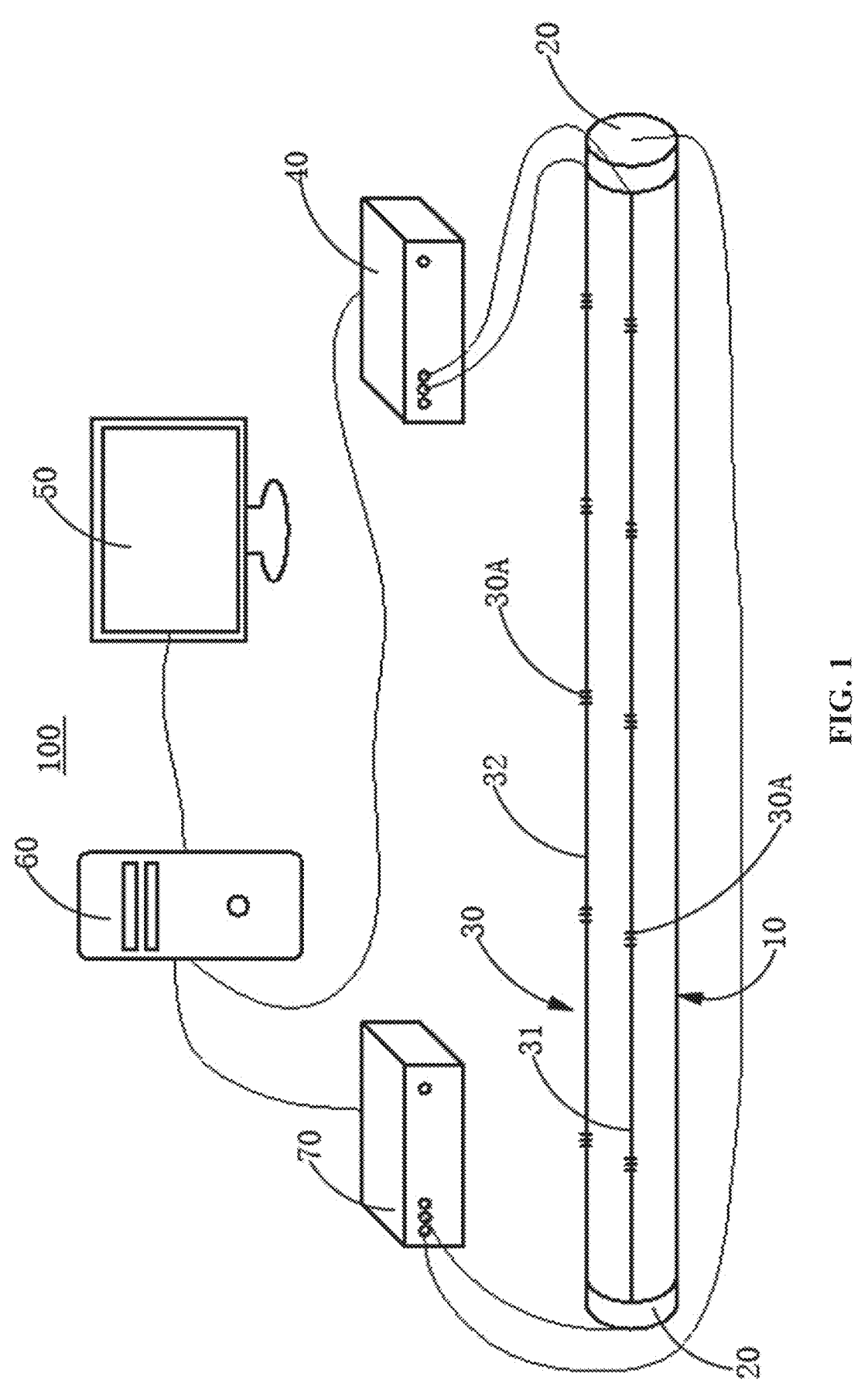
FIG. 1 is a structural diagram of the torsion compensation system of the FBG curvature sensor according to the embodiment of the invention.

Compensation system 100;
FBG curvature sensor 10;

angle sensor 20;
FBG string 30;
the first FBG string 31;
the second FBG string 32;
grating measuring point 30A;
FBG demodulator 40;
computer 50;
server 60;
angle monitoring host 70.

DETAILED DESCRIPTION OF THE EMBODIMENTS

In order to make the purpose, technical scheme, and advantages of the technical scheme of the invention more clear, the technical scheme of the embodiment of the invention will be clearly and completely described in the following part in combination with the attached figures of the embodiment of the invention, the same mark in the attached figures represents the same component. It should be noted that the embodiment described is part of the embodiment of the invention, not all embodiments. Based on the described embodiment of the invention, all other embodiments obtained by ordinary technicians in this field without the need for creative labor belong to the scope of protection of the invention.

Unless otherwise defined, the technical or scientific terms used here shall have the usual meaning understood by persons with general skills in the field to which the invention belongs. First, second, and similar words used in the instruction and claims of the invention do not indicate any order, quantity, or importance, but are only used to distinguish different components. Similarly, similar words such as one or a/an do not necessarily mean quantity limitation. Similar words such as comprising or comprises mean that the elements or objects in front of the word cover the elements or objects listed after the word and their equivalents, without excluding other elements or objects. Similar words such as connected or connects are not limited to physical or mechanical connections but can comprise electrical connections, whether direct or indirect. Up, down, left, right, etc. are only used to represent the relative positional relationship, when the absolute position of the described object changes, the relative positional relationship may also change accordingly.

Figure 2:
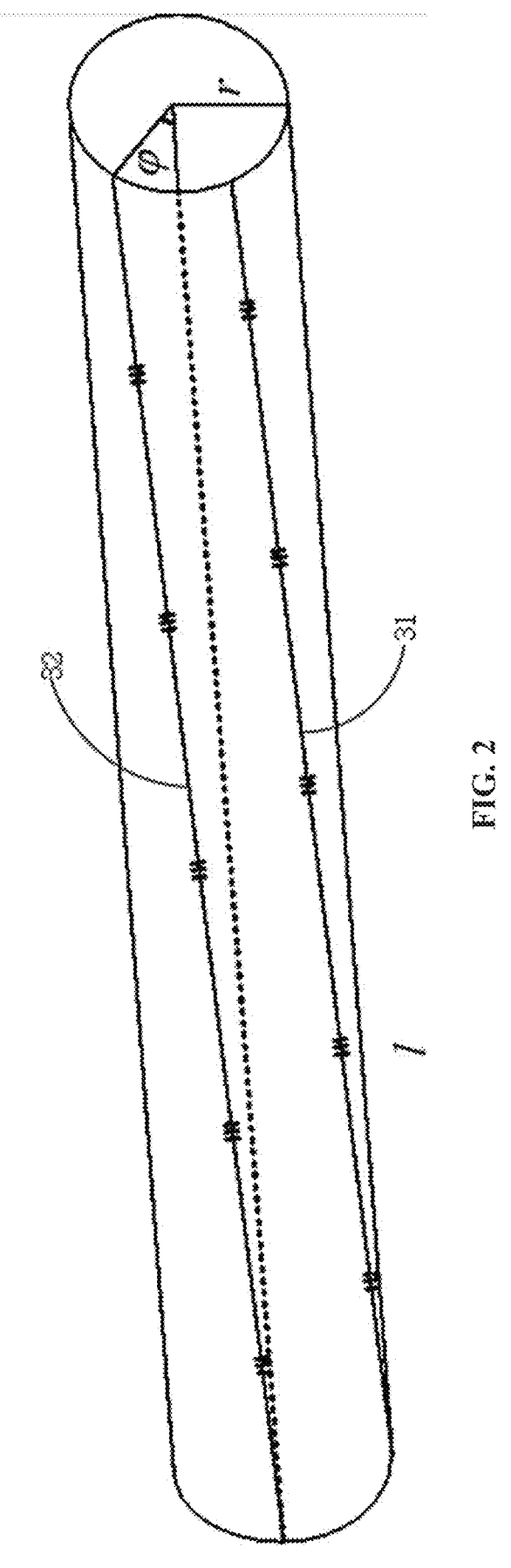
FIG. 2 is a torsion diagram of the FBG curvature sensor according to the embodiment of the invention.
Figure 3:
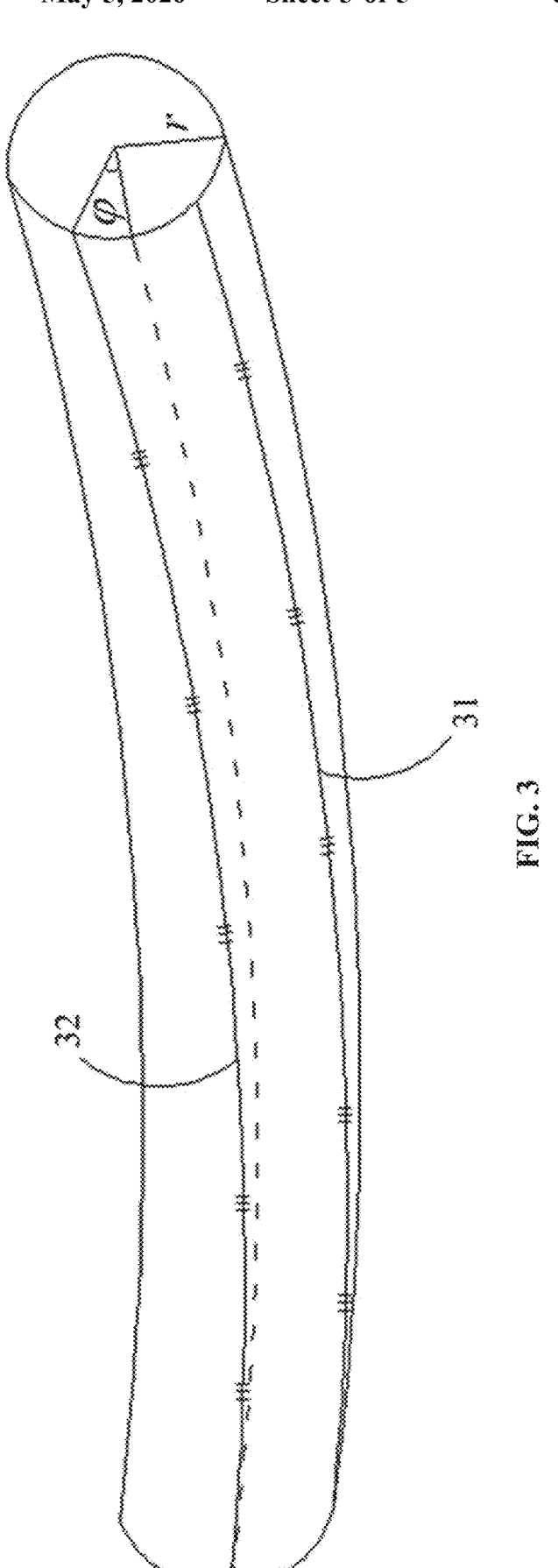
FIG. 3 is a torsion and bending superposition diagram of the FBG curvature sensor according to the embodiment of the invention.
Figure 4:
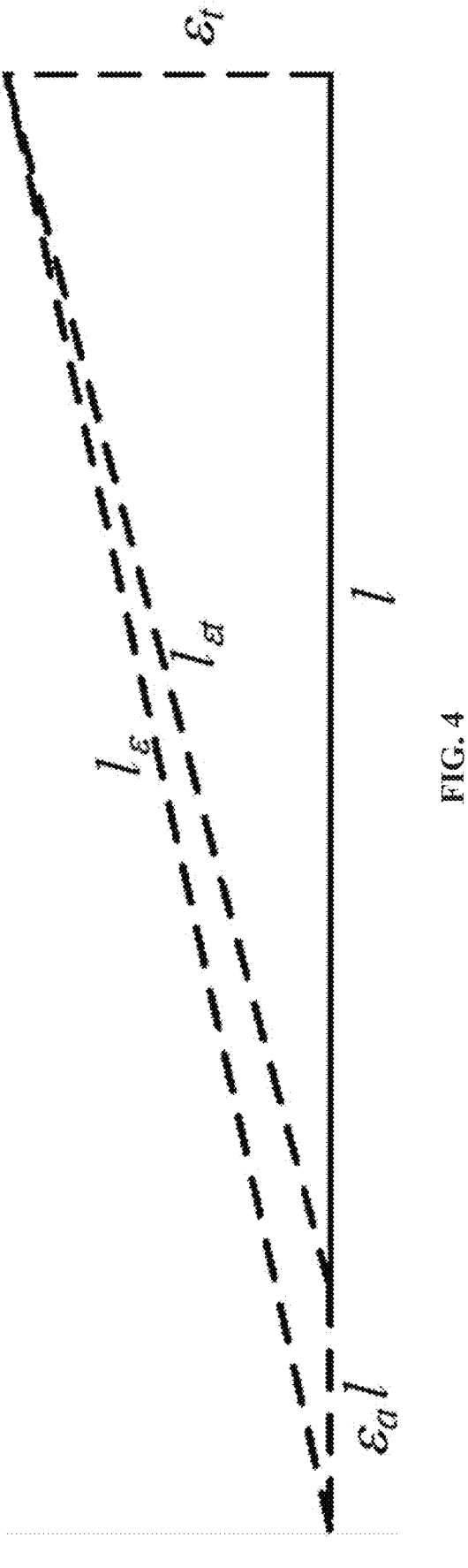
FIG. 4 is an expansion diagram of the fiber light string under the torsion and bending superposition of the FBG curvature sensor according to the embodiment of the invention.

According to the torsion compensation system 100 of the FBG curvature sensor 10 in the first aspect of the invention, as shown in FIG. 1 to FIG. 4, comprising:

a FBG curvature sensor 10, installed on the scraper conveyor;

angle sensors 20, comprising two and installed on both sides of the FBG curvature sensor 10, are configured to obtain the torsion angle of the FBG curvature sensor by monitoring the difference between the two ends of the FBG curvature sensor 10;

a FBG string 30, arranged on the FBG curvature sensor 10 to form a plurality of grating measuring points 30A, is configured to perceive the center wavelength of the FBG curvature sensor 10;

a FBG demodulator 40, coupled with the FBG string 30, is configured to convert the optical signal of the center wavelength perceived by the FBG string 30 into an electrical signal;

a computer 50, respectively coupled with the angle sensors 20 and the FBG demodulator 40, is configured to eliminate the FBG wavelength variation caused by torsion based on the received torsion angle and the center wavelength, so as to obtain the curvature of the position where the grating measuring point 30A is located after torsion compensation.

The torsion angle $\varphi$ of the FBG curvature sensor 10 is obtained by monitoring the difference between the two ends of the FBG curvature sensor 10 by the angle sensors 20, and the center wavelength of each grating measuring point 30A on the FBG curvature sensor 10 is monitored by the FBG string 30, the optical signal of the center wavelength perceived by the FBG string 30 is converted into an electrical signal by the FBG demodulator 40; after the torsion angle and center wavelength are obtained by the computer 50, the positive strain $\varepsilon_a$ perceived by the sensor FBG string 30 is corrected by the computer 50 based on the grating wavelength variation; then, the curvature of the FBG curvature sensor 10 subjected to the superposition of bending and torsion is corrected by the computer 50 based on the modified sensor FBG string 30 sensing strain $\varepsilon_a$, and the curvature K of the position of the grating measuring point 30A is obtained. The compensation system 100 separates the wavelength drift of the FBG of the sensitive element into the bending and torsion of the sensor, by eliminating the wavelength drift induced by the torsion of the sensor, the torsion compensation of the FBG curvature sensor 10 of the scraper conveyor is realized, which can solve the curvature characteristics of the sensor more accurately and realize the straightness perception of the scraper conveyor with higher precision.

In an example of the invention, the FBG string 30 comprises:

the first FBG string 31 arranged along the extended direction of the FBG curvature sensor 10;

the second FBG string 32 arranged along the extended direction of the FBG curvature sensor 10;

where the first FBG string 31 and the second FBG string 32 are separated by 90 degrees in the circumferential direction of the FBG curvature sensor 10.

that is to say, the first FBG string 31 and the second FBG string 32 are orthogonally arranged on the surface of the FBG curvature sensor 10, through the orthogonal arrangement of the first FBG string 31 and the second FBG string 32, the center wavelength of the grating measuring point 30A on the surface of the FBG curvature sensor 10 can be accurately monitored; where the first FBG string 31 and the second FBG string 32 sense the center wavelength signal of the FBG curvature sensor 10 through multiple equally spaced grating measuring points 30A.

In an example of the invention, the computer 50 comprises:

the first correction module, the first correction is configured to correct the positive strain $\varepsilon_a$ perceived by the FBG string based on the grating wavelength variation;

the second correction module, the second correction module is configured to correct the curvature of the FBG curvature sensor 10 under the superposition of bending and torsion based on the positive strain $\varepsilon_a$ perceived by a corrected FBG string 30, so as to obtain a curvature K of a position of the grating measuring point 30A after torsion compensation.

According to the field application of the FBG curvature sensor 10 on the scraper conveyor, the working conditions are simplified and analyzed, the torsion angle $\varphi$ is introduced, and the positive strain $\varepsilon_a$ of the sensor FBG string 30 is corrected based on the grating wavelength variation $\Delta\lambda$; on this basis, based on the corrected sensor FBG string 30 to sense the positive strain $\varepsilon_a$, the curvature of the sensor 7 8 subjected to bending and torsion superposition is corrected, and finally the curvature of the position where the grating measuring point 30A is located after torsion compensation is obtained.

In an example of the invention, the correction formula for the positive strain of the FBG caused by the bending of the FBG curvature sensor 10 is:

$$\varepsilon_a = \left[\left(1 + \frac{\Delta\lambda}{\lambda_B(1 - p_e)}\right)^2 - \left(\frac{r\varphi}{l}\right)^2\right]^{\frac{1}{2}} - 1$$

where r is the distance between the FBG and a centroid, φ is the torsion error angle of the FBG curvature sensor 10 of the scraper conveyor, l is the length of the FBG curvature sensor 10 of the scraper conveyor, $\Delta\lambda$ is the grating wavelength variation, $\lambda_B$ is the initial wavelength of the FBG, and $P_e$ is the effective elastic-optical coefficient of the fiber;

Specifically, the correction formula for the positive strain of the FBG caused by the bending of the sensor is as follows:

When the sensor bends and twists, the FBG string 30 pasted on the sensor substrate is expanded, according to the geometric relationship, the following equation is established:

$$\begin{cases} l_\varepsilon^2 = (l + \varepsilon_a l)^2 + (\varepsilon_t l)^2 \\ l_\varepsilon = l(1 + \varepsilon) \end{cases}$$

where the length of the FBG string 30 under the superposition of bending and torsion is $l_\varepsilon$, the axial strain of the FBG is ε, $\varepsilon_a$ is the positive strain of the FBG caused by the bending of the sensor, and $\varepsilon_t$ is the shear strain of the FBG caused by the torsion of the sensor.

According to the formula, the joint solution simplification can be obtained:

$$\varepsilon_a = \left[(1 + \varepsilon)^2 - \varepsilon_t^2\right]^{\frac{1}{2}} - 1$$

The axial strain of the FBG is ε, according to the variation of the grating wavelength, it can be expressed as follows:

$$\varepsilon = \frac{\Delta\lambda}{\lambda_B(1 - p_e)}$$

According to the above sensor FBG string 30 sensing positive strain $\varepsilon_a$ and the FBG axial strain is ε, the sensor bending causes the FBG to produce positive strain $\varepsilon_a$:

$$\varepsilon_a = \left[\left(1 + \frac{\Delta\lambda}{\lambda_B(1 - p_e)}\right)^2 - \left(\frac{r\varphi}{l}\right)^2\right]^{\frac{1}{2}} - 1$$

where $\varepsilon_t = r\varphi/l$.

In an example of the invention, in S30, the modified expression of the curvature K at the position of the grating measuring point 30A after torsion compensation is:

$$K = \left[\left(\frac{1}{r} + \frac{\Delta\lambda}{M}\right)^2 - \left(\frac{\varphi}{l}\right)^2\right]^{\frac{1}{2}} - \frac{1}{r}$$

where r is the distance between the FBG and the centroid, φ is the torsion error angle of the FBG curvature sensor of the scraper conveyor, l is the length of the FBG curvature sensor of the scraper conveyor, $\Delta\lambda$ is the grating wavelength variation, $\lambda_B$ is the initial wavelength of the FBG, and M is the curvature sensitivity coefficient of the FBG.

It should be noted that $M=(1-P_e)\lambda_B r$, which is a quantity related to FBG and sensor collection. When the sensor is fabricated and works according to the theoretical conditions, M is a fixed value. Therefore, the formula about M can be simplified as $KM=\Delta\lambda_B$.

In an example of the invention, the computer 50 also comprises:

a visualization module, the visualization module is configured to realize the visualization of the two-dimensional curve and the three-dimensional curve of the scraper conveyor through the discrete curvature continuous algorithm based on compensated curvature information; through the visualization module, the two-dimensional curve and three-dimensional curve of the scraper conveyor can be seen more intuitively.

Of course, the invention is not limited to this, the computer 50 can also have the functions of data storage, data secondary processing, data output, and historical query.

In an example of the invention, it also comprises: a server 60, one end of the server is coupled with the angle sensors 20 and the FBG demodulator 40 respectively, and the other end is coupled with the computer 50, which is configured to receive and store the torsion angle and the center wavelength, so that the torsion angle and the center wavelength stored in the server 60 can be called by the computer 50.

In other words, the server 60 can receive the torsion angle of the FBG curvature sensor 10 of the scraper conveyor and the center wavelength value of each grating measuring point 30A in real-time, the above data is called by the computer 50, and the center wavelength drift induced by the torsion angle is eliminated by the computer 50 to realize the curvature perception accuracy compensation.

Preferably, it also comprises: an angle monitoring host 70, coupled between the angle sensors 20 and the server 60, is configured to receive the torsion angle obtained by the angle sensors 20 and upload it to the server 60 in real time.

According to the second aspect of the invention, a compensation method for the torsion compensation system 100 of the FBG curvature sensor 10 as described above, as shown in FIG. 5, comprises the following steps:

S10: The torsion angle φ of the FBG curvature sensor 10 is obtained by monitoring the difference between the two ends of the FBG curvature sensor 10 by the angle sensors 20; the center wavelength of each grating measuring point 30A on the FBG curvature sensor 10 is monitored by the FBG string 30;

S20: The positive strain $\varepsilon_a$ perceived by the FBG string 30 is corrected by the computer 50 based on the grating wavelength variation;

S30: The curvature of the FBG curvature sensor subjected to bending and torsion superposition is corrected by the computer 50 based on the strain $\varepsilon_a$ perceived by the corrected FBG string 30, and the curvature K of the position of the grating measuring point 30A after torsion compensation is obtained.

The compensation method separates the wavelength drift of the FBG of the sensitive element into the bending and torsion of the sensor, by eliminating the wavelength drift induced by the torsion of the sensor, the torsion compensation of the FBG curvature sensor 10 of the scraper conveyor is realized, which can solve the curvature characteristics of the sensor more accurately and realize the straightness perception of the scraper conveyor with higher precision.

In an example of the invention, after S30, it also comprises:

Based on the compensated curvature information, the computer can also realize the visualization of the two-dimensional curve and the three-dimensional curve of the scraper conveyor through the discrete curvature continuous algorithm.

In an example of the invention, in S20, the correction formula for the positive strain of the FBG caused by the bending of the FBG curvature sensor is:

$$\varepsilon_a = \left[\left(1 + \frac{\Delta\lambda}{\lambda_B(1-p_e)}\right)^2 - \left(\frac{r\varphi}{l}\right)^2\right]^{\frac{1}{2}} - 1$$

where r is the distance between the FBG and the centroid, φ is the torsion error angle of the FBG curvature sensor 10 of the scraper conveyor, l is the length of the FBG curvature sensor 10 of the scraper conveyor, $\Delta\lambda$ is the grating wavelength variation, $\lambda_B$ is the initial wavelength of the FBG, and $P_e$ is the effective elastic-optical coefficient of the fiber.

Specifically, the correction formula for the positive strain of the FBG caused by the bending of the sensor is as follows:

When the sensor bends and twists, the FBG string 30 pasted on the sensor substrate is expanded, according to the geometric relationship, the following equation is established:

$$\begin{cases} l_\varepsilon^2 = (l + \varepsilon_a l)^2 + (\varepsilon_t l)^2 \\ l_\varepsilon = l(1 + \varepsilon) \end{cases}$$

where the length of the FBG string 30 under the superposition of bending and torsion is $l_\varepsilon$, the axial strain of the FBG is $\varepsilon$, $\varepsilon_a$ is the positive strain of the FBG caused by the bending of the sensor, and $\varepsilon_t$ is the shear strain of the FBG caused by the torsion of the sensor.

According to the formula, the joint solution simplification can be obtained:

$$\varepsilon_a = \left[(1+\varepsilon)^2 - \varepsilon_t^2\right]^{\frac{1}{2}} - 1$$

The axial strain of the FBG is $\varepsilon$, according to the variation of the grating wavelength, it can be expressed as follows:

$$\varepsilon = \frac{\Delta\lambda}{\lambda_B(1-p_e)}$$

According to the above sensor FBG string 30 sensing positive strain $\varepsilon_a$ and the FBG axial strain is $\varepsilon$, the sensor bending causes the FBG to produce positive strain $\varepsilon_a$:

$$\varepsilon_a = \left[\left(1 + \frac{\Delta\lambda}{\lambda_B(1-p_e)}\right)^2 - \left(\frac{r\varphi}{l}\right)^2\right]^{\frac{1}{2}} - 1$$

where $\varepsilon_t = r\varphi/l$.

In an example of the invention, in S30, the modified expression of the curvature K at the position of the grating measuring point 30A after torsion compensation is:

$$K = \left[\left(\frac{1}{r} + \frac{\Delta\lambda}{M}\right)^2 - \left(\frac{\varphi}{l}\right)^2\right]^{\frac{1}{2}} - \frac{1}{r}$$

where r is the distance between the FBG and the centroid, φ is the torsion error angle of the FBG curvature sensor of the scraper conveyor, l is the length of the FBG curvature sensor of the scraper conveyor, $\Delta\lambda$ is the grating wavelength variation, $\lambda_B$ is the initial wavelength of the FBG, and M is the curvature sensitivity coefficient of the FBG.

It should be noted that $M=(1-P_e)\lambda_B r$, which is a quantity related to FBG and sensor collection. When the sensor is fabricated and works according to the theoretical conditions, M is a fixed value. Therefore, the formula about M can be simplified as $KM=\Delta\lambda_B$.

It should be noted that in S20 and S30, the simplified analysis of the working conditions of the sensor comprises the following conditions: First, it is assumed that the curvature sensor of the scraper conveyor based on the FBG has a uniform torsion in the length direction; secondly, it is assumed that the curvature sensor of the scraper conveyor based on FBG works under constant temperature conditions, without considering the change of FBG wavelength caused by temperature. Finally, it is assumed that the strain transfer efficiency between the FBG and the surface matrix is 100% when the curvature sensor of the scraper conveyor based on the FBG senses the deformation.

In the above content, the demonstration implementation method of the torsion compensation system 100 and the compensation method for the FBG curvature sensor 10 proposed by the invention is described in detail concerning the preferred embodiment. However, the technical personnel in this field can understand that under the premise of not deviating from the concept of the invention, a variety of variants and modifications can be made to the above embodiment, and various technical features and structures proposed by the invention can be combined in a variety of ways, without exceeding the scope of protection of the invention, the scope of protection of the invention is determined by the attached claims.

What is claimed is:

1. A torsion compensation system of a fiber Bragg grating (FBG) curvature sensor, comprising:
   a FBG curvature sensor, installed on a scraper conveyor;
   two angle sensors, one installed on each side of the FBG curvature sensor, that are configured to obtain a torsion angle of the FBG curvature sensor by monitoring a difference between two ends of the FBG curvature sensor;
   a FBG string, arranged on the FBG curvature sensor to form a plurality of grating measuring points, wherein the FBG string is configured to perceive a center wavelength of the FBG curvature sensor;

a FBG demodulator, coupled with the FBG string, wherein the FBG demodulator is configured to convert an optical signal of the center wavelength perceived by the FBG string into an electrical signal; and a computer, respectively coupled with the angle sensors and the FBG demodulator, wherein the computer is configured to eliminate an FBG wavelength variation caused by torsion based on a received torsion angle and the center wavelength to obtain a curvature of a position where the grating measuring point is located after torsion compensation;

wherein the computer comprises:

a first correction module, wherein the first correction module is configured to correct a positive strain $\varepsilon_a$ perceived by the FBG string based on the FBG wavelength variation; and a second correction module, wherein the second correction module is configured to correct a curvature of the FBG curvature sensor under a superposition of bending and torsion based on a positive strain $\varepsilon_a$ perceived by a corrected FBG string to obtain a curvature K of a position of the grating measuring point after the torsion compensation.

2. The torsion compensation system of the FBG curvature sensor according to claim 1, wherein the FBG string comprises:

a first FBG string arranged along an extended direction of the FBG curvature sensor; and a second FBG string arranged along the extended direction of the FBG curvature sensor;

wherein the first FBG string and the second FBG string are separated by 90 degrees in a circumferential direction of the FBG curvature sensor.

3. The torsion compensation system of the FBG curvature sensor according to claim 1, wherein a correction formula for the positive strain of an FBG caused by the bending of the FBG curvature sensor is:

$$\varepsilon_a = \left[ \left( 1 + \frac{\Delta\lambda}{\lambda_B(1 - p_e)} \right)^2 - \left( \frac{r\varphi}{l} \right)^2 \right]^{\frac{1}{2}} - 1$$

wherein r is a distance between the FBG and a centroid, $\varphi$ is a torsion error angle of the FBG curvature sensor of the scraper conveyor, 1 is a length of the FBG curvature sensor of the scraper conveyor, $\Delta\lambda$ is the FBG wavelength variation, $\lambda_B$ is an initial wavelength of the FBG, and $P_e$ is an effective elastic-optical coefficient of a fiber.

4. The torsion compensation system of the FBG curvature sensor according to claim 1, wherein a modified expression of the curvature K at the position of the grating measuring point after the torsion compensation is:

$$K = \left[ \left( \frac{1}{r} + \frac{\Delta\lambda}{M} \right)^2 - \left( \frac{\varphi}{l} \right)^2 \right]^{\frac{1}{2}} - \frac{1}{r}$$

wherein r is a distance between an FBG and a centroid, $\varphi$ is a torsion error angle of the FBG curvature sensor of the scraper conveyor, 1 is a length of the FBG curvature sensor of the scraper conveyor, $\Delta\lambda$ is the FBG wavelength variation, $\lambda_B$ is an initial wavelength of the FBG, and M is a curvature sensitivity coefficient of the FBG.

5. The torsion compensation system of the FBG curvature sensor according to claim 1, wherein the computer further comprises:

a visualization module, the visualization module is configured to realize a visualization of a two-dimensional curve and a three-dimensional curve of the scraper conveyor through a discrete curvature continuous algorithm based on compensated curvature information.

6. The torsion compensation system of the FBG curvature sensor according to claim 1, wherein the torsion compensation system further comprises: a server, a first end of the server is coupled with the angle sensors and the FBG demodulator, respectively, and a second end of the server is coupled with the computer, the second end is configured to receive and store the torsion angle and the center wavelength, wherein the torsion angle and the center wavelength stored in the server are allowed to be called by the computer.

7. A compensation method for the torsion compensation system of the FBG curvature sensor according to claim 1, comprising the following steps:

S10: obtaining the torsion angle φ of the FBG curvature sensor by monitoring the difference between the two ends of the FBG curvature sensor by the angle sensors; monitoring the center wavelength of each of the plurality of grating measuring points on the FBG curvature sensor by the FBG string;

S20: correcting the positive strain $\varepsilon_a$ perceived by the FBG string by the computer based on the FBG wavelength variation;

S30: correcting the curvature of the FBG curvature sensor subjected to the superposition of bending and torsion by the computer based on the positive strain $\varepsilon_a$ perceived by the corrected FBG string, and obtaining the curvature K of the position of the grating measuring point after the torsion compensation.

8. The compensation method according to claim 7, wherein after S30, the compensation method further comprises:

based on compensated curvature information, visualizing with the computer a two-dimensional curve and a three-dimensional curve of the scraper conveyor through a discrete curvature continuous algorithm.

9. The compensation method according to claim 7, wherein in S20, a correction formula for the positive strain of an FBG caused by the bending of the FBG curvature sensor is:

$$\varepsilon_a = \left[ \left( 1 + \frac{\Delta\lambda}{\lambda_B(1 - p_e)} \right)^2 - \left( \frac{r\varphi}{l} \right)^2 \right]^{\frac{1}{2}} - 1$$

wherein r is a distance between the FBG and a centroid, φ is a torsion error angle of the FBG curvature sensor of the scraper conveyor, 1 is a length of the FBG curvature sensor of the scraper conveyor, $\Delta\lambda$ is the FBG wavelength variation, $\lambda_B$ is an initial wavelength of the FBG, and $P_e$ is an effective elastic-optical coefficient of a fiber.

10. The compensation method according to claim 7, wherein in S30, a modified expression of the curvature K at the position of the grating measuring point after the torsion compensation is:

$$K = \left[\left(\frac{1}{r} + \frac{\Delta\lambda}{M}\right)^2 - \left(\frac{\varphi}{l}\right)^2\right]^{\frac{1}{2}} - \frac{1}{r}$$

wherein r is a distance between an FBG and a centroid, φ is a torsion error angle of the FBG curvature sensor of the scraper conveyor, l is a length of the FBG curvature sensor of the scraper conveyor, $\Delta\lambda$ is the FBG wavelength variation, $\lambda_B$ is an initial wavelength of the FBG, and M is a curvature sensitivity coefficient of the FBG.

11. The compensation method according to claim 7, wherein in the torsion compensation system, the FBG string comprises:

a first FBG string arranged along an extended direction of the FBG curvature sensor; and a second FBG string arranged along the extended direction of the FBG curvature sensor;

wherein the first FBG string and the second FBG string are separated by 90 degrees in a circumferential direction of the FBG curvature sensor.

12. The compensation method according to claim 7, wherein in the torsion compensation system, a correction formula for the positive strain of an FBG caused by the bending of the FBG curvature sensor is:

$$\varepsilon_a = \left[\left(1 + \frac{\Delta\lambda}{\lambda_B(1 - p_e)}\right)^2 - \left(\frac{r\varphi}{l}\right)^2\right]^{\frac{1}{2}} - 1$$

wherein r is a distance between the FBG and a centroid, φ is a torsion error angle of the FBG curvature sensor of the scraper conveyor, l is a length of the FBG curvature sensor of the scraper conveyor, $\Delta\lambda$ is the FBG wavelength variation, $\lambda_B$ is an initial wavelength of the FBG, and $P_e$ is an effective elastic-optical coefficient of a fiber.

13. The compensation method according to claim 7, wherein in the torsion compensation system, a modified expression of the curvature K at the position of the grating measuring point after the torsion compensation is:

$$K = \left[\left(\frac{1}{r} + \frac{\Delta\lambda}{M}\right)^2 - \left(\frac{\varphi}{l}\right)^2\right]^{\frac{1}{2}} - \frac{1}{r}$$

wherein r is a distance between an FBG and a centroid, φ is a torsion error angle of the FBG curvature sensor of the scraper conveyor, l is a length of the FBG curvature sensor of the scraper conveyor, $\Delta\lambda$ is the FBG wavelength variation, $\lambda_B$ is an initial wavelength of the FBG, and M is a curvature sensitivity coefficient of the FBG.

14. The compensation method according to claim 7, wherein in the torsion compensation system, the computer further comprises: a visualization module, the visualization module is configured to visualize a two-dimensional curve and a three-dimensional curve of the scraper conveyor through a discrete curvature continuous algorithm based on compensated curvature information.

15. The compensation method according to claim 7, wherein the torsion compensation system further comprises: a server, a first end of the server is coupled with the angle sensors and the FBG demodulator, respectively, and a second end of the server is coupled with the computer, the second end is configured to receive and store the torsion angle and the center wavelength, wherein the torsion angle and the center wavelength stored in the server are allowed to be called by the computer.

16. The compensation method according to claim 11, wherein after S30, the compensation method further comprises:

based on compensated curvature information, visualizing with the computer a two-dimensional curve and a three-dimensional curve of the scraper conveyor through a discrete curvature continuous algorithm.

17. The compensation method according to claim 12, wherein after S30, the compensation method further comprises:

based on compensated curvature information, visualizing with the computer a two-dimensional curve and a three-dimensional curve of the scraper conveyor through a discrete curvature continuous algorithm.

18. The compensation method according to claim 13, wherein after S30, the compensation method further comprises:

based on compensated curvature information, visualizing with the computer a two-dimensional curve and a three-dimensional curve of the scraper conveyor through a discrete curvature continuous algorithm.

19. The compensation method according to claim 14, wherein after S30, the compensation method further comprises:

based on the compensated curvature information, visualizing with the computer the two-dimensional curve and the three-dimensional curve of the scraper conveyor through the discrete curvature continuous algorithm.

20. The compensation method according to claim 15, wherein after S30, the compensation method further comprises:

based on compensated curvature information, visualizing with the computer a two-dimensional curve and a three-dimensional curve of the scraper conveyor through a discrete curvature continuous algorithm.

* * * * *